July 13, 1926.
B. H. URSCHEL
UNIVERSAL JOINT
Filed Oct. 6, 1924
1,592,396
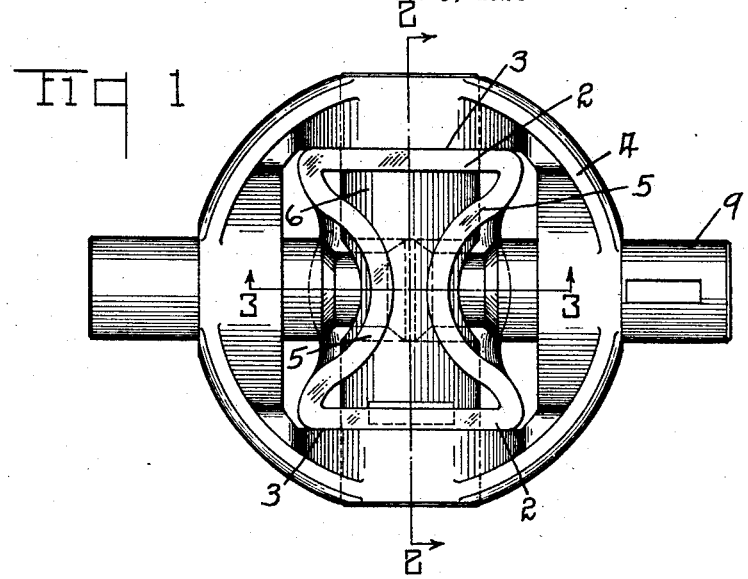
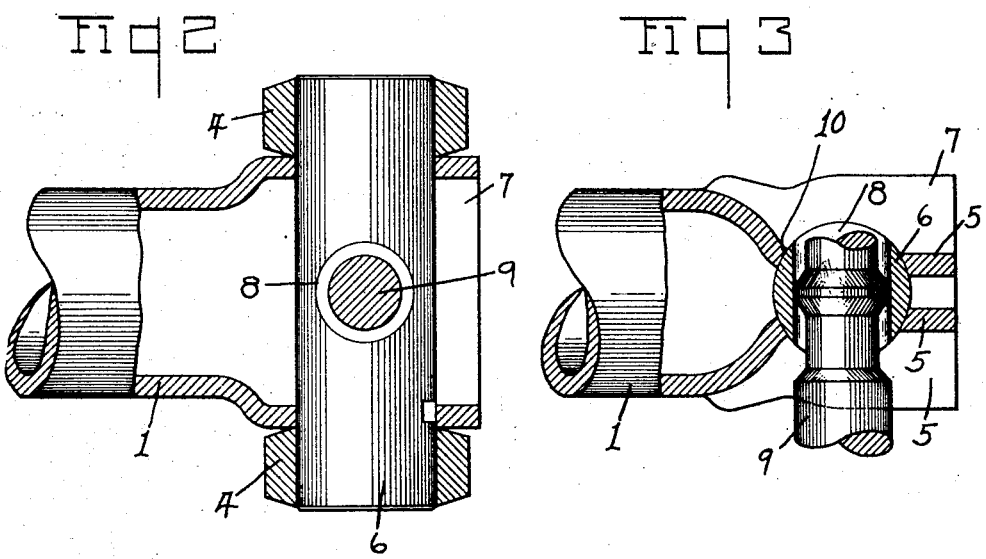
Inventor
Bertie H. Urschel
By Owen, Owen & Crampton
Attorney Patented July 13, 1926.

1,592,396

UNITED STATES PATENT OFFICE.

BERTIS H. URSCHEL, OF BOWLING GREEN, OHIO.

UNIVERSAL JOINT.

Application filed October 6, 1924. Serial No. 741,848.

My invention has for its object to provide an improvement in universal joint manufacture whereby an exceedingly durable joint may be made at a low cost of production. The invention particularly relates to an efficient means for connecting the tubular transmission shaft to the universal joint elements. In the preferred form of the invention, the transmission shaft has a figure 8 shaped head when viewed from a point along the line of the axis of the shaft. The head is provided with flattened side portions that form the top and bottom of the figure 8 cross section for forming the lateral universal joint ring bearing surfaces. Thus the universal joint pin that is directly connected to the transmission shaft will be engaged by a relatively large bearing area at the center of the head as well as near the remote surfaces of the head. Where the invention is used in connection with universal joints having cross pins whose axes lie in a common plane, the cross pins extend through the head, one extending through the said lateral surfaces and the other extending through the shorter cross dimension of the figure 8 cross section which enables the shaft to move angularly with respect not only to the first pin to which it is directly connected, but also to the second pin to take changing angular positions with reference to the axis of the second pin. Where the transmission shafts are formed hollow to attain lightness as well as torsional strength, the end portions of the tubular members, from which the shafts are formed, are flattened in each case at two sides, while the other two sides are bent, preferably arched, inwardly and so as to extend within the line projection of the pin to which the shaft is directly connected, on a plane at right angles to the axis of the shaft. Thus when the shaft head is bored to receive the said pin, the inwardly extending arcuate sides will also be bored to size and consequently will receive the pin and will also receive the cross pin that extends through the first named pin, the arcuate sides being forced sufficiently close to each other that the openings formed therein will be sufficiently large that the required, though limited, angular movements of the transmission shaft in the plane of the axis of the second pin will not be interfered with by the second pin. Thus the flattened side portions of the tubular or hollow head are joined on all sides of the cross pins by the arcuate portions which greatly increases their rigidity. The flattened sides are fitted to the universal joint ring to form lateral bearing surfaces against the inside bearing surfaces of the ring. Thus a shaft connecting part or head is produced that will sustain the maximum torque sustainable by the body of the shaft that bears on the transmission pin of the universal joint throughout the length of the portion of the pin within the universal joint transmission ring, and is particularly strengthened at parts more remote from the axis of the shaft through which the greater part of the force is transmitted from the universal joint to the shaft.

The invention may be contained in universal joints that vary in their details. To illustrate a practical application of the invention, I have selected a universal joint embodying the invention and shall describe it hereinafter. The universal joint selected as an example of embodiments of my invention is shown in the accompanying drawing.

Figure 1 is a top view of a part of a universal joint, the shell commonly connected to the driving shaft being omitted. Figure 2 is a view of a section taken on the plane indicated by the line 2—2 marked in Fig. 1. Figure 3 is a section of a part of the universal joint taken on the line 3—3 indicated in Fig. 1.

The particular universal joint selected for purposes of illustration belongs to that type of universal joint wherein the axes of the cross pins lie in the same plane. In such universal joints one of the pins extend through the other, the diameter of the first being reduced or being of such a size and the opening through the other being sufficiently large to permit the first pin to make short angular movements about the axis of the second pin. The universal joint ring is pivotally connected to a shell by means of the second pin, the shell being connected to the driving shaft while the transmission shaft is connected to the second pin in the manner well known in the art. The invention particularly provides for shaping the end of the transmission shaft that is connected to the universal joint pin to establish an efficient universal joint connection.

In the form of construction shown, the transmission shaft is formed of a tubular member 1 having an 8-shaped hollow head for connecting the shaft to the universal joint. The shaft 1, however, may be formed of a solid member and provided with a solid head. The head is provided with flattened portions 2 that form lateral bearing surfaces that fit the lateral bearing surfaces 3 of the universal joint ring 4. The flattened portions or sides of the shaft 1 are joined by sides that extend inwardly with respect to planes that join the side edges of the flattened portions. Thus the sides 2 are joined together by the arcuate sides 5 that extend towards the axis of the transmission shaft. The arcuate sides 5 are brought sufficiently close together at points on opposite sides of the axis of the shaft as to lie within the projection of the universal joint pin 6 to which the shaft is directly connected, and so that when the head 7 of the shaft is bored, the four sides of the head are opened or pierced, and when the pin 6 is placed in position, it passes through the four sides and the centers of the openings formed in the arcuate sides will lie in the axis of the cylindrical opening 8 formed in the pin 6 for receiving the universal joint cross pin 9 when the universal joint is assembled. The arcuate sides 5 are brought sufficiently close together so that the angular movements of the transmission shaft 1 with respect to the pin 9 will not cause engagement between the edge of the openings 10 formed in the arcuate sides 5 and the pin 9. Thus the openings 10 of the arcuate sides 5 are such as to be as large or larger than the cylindrical opening 8 through the pin 6 to enable the same extreme angular movements of the shaft that is permitted in the pin 6, and yet avoid engagement with the pin 9.

By this arrangement, the connecting head of the shaft 1 may be readily formed and the contact surface between the head and the pin to which it is connected extends substantially the length of that portion of the pin within the ring 4 as well as transverse to the pin at the ends of the said portion. Also the lateral portions that extend across the pin are joined by the indented or arcuate sides to parts of the head that completely surround the pins, which greatly increases the rigidity of the construction.

I claim:—

1. In a universal joint, a transmission shaft having an 8-shaped head, a universal joint pin extending through the shaft head in the direction of the major cross dimension of the head, and a universal joint cross pin extending through the head in the direction of the smaller cross dimension of the head.

2. In a universal joint, a transmission shaft having an 8-shaped head, a universal joint pin extending through the shaft head in the direction of the major cross dimension of the head, and a universal joint cross pin extending through the head in the direction of the smaller cross dimension of the head and through the first named pin.

3. In a universal joint, a transmission shaft having an 8-shaped hollow head, a universal joint pin extending through the head in a direction to locate the greater portion of the head nearer the ends of the pin and the lesser portion at the center of the pin.

4. In a universal joint, a tubular transmission shaft having an 8-shaped end portion integral with the shaft, a universal joint pin extending through the head in the direction of the major cross dimension and a universal joint cross pin extending through the head in the direction of the smaller cross dimension of the head.

5. In a universal joint, a transmission shaft having a tubular head portion, the head portion having lateral bearing faces joined by surfaces that arcuate inwardly with respect to the axis of the shaft from near the ends of the lateral bearing faces, and a universal joint pin extending through the bearing faces.

6. In a universal joint, a transmission shaft having a head portion, the head portion having lateral bearing faces joined by surfaces that are inclined inwardly with respect to the axis of the shaft from near the ends of the lateral bearing faces, a universal joint pin extending through the bearing faces, and a universal joint cross pin extending through the inner end portions of the inclined surfaces.

7. In a universal joint, a transmission shaft having a tubular head portion, the head portion having lateral bearing faces joined by surfaces that arcuate inwardly with respect to the axis of the shaft from near the ends of the lateral bearing faces, a universal joint pin extending through the bearing faces and a universal joint cross pin extending through the arcuate surfaces.

8. In a universal joint, a tubular transmission shaft having two flattened side portions and two inwardly extending side portions, openings formed through the four side portions, and a universal joint pin extending through the said openings.

9. In a universal joint, a tubular transmission shaft having two flattened side portions and two inwardly extending side portions, openings formed through the four side portions, and a universal joint pin extending through the said openings of the flattened side portions, a universal joint cross pin extending through the openings of the two inwardly extending side portions.

10. In a universal joint, a tubular transmission shaft having two flattened side portions and two inwardly extending side portions, openings formed through the four side portions, a universal joint pin extending through the said openings, and a universal joint cross pin extending through the first named pin and the openings of the inwardly extending side portions.

11. In a universal joint, a tubular transmission shaft having two flattened side portions and two arcuate inwardly extending side portions, openings formed through the four side portions, and a universal joint pin extending through the said openings.

12. In a universal joint, a tubular transmission shaft having two flattened side portions and two arcuate inwardly extending side portions, openings formed through the four side portions, a universal joint pin extending through the said openings of the flattened side portions and a universal joint cross pin extending through the openings of the two arcuate side portions.

13. In a universal joint, a universal joint ring having lateral and cylindrical bearing and supporting surfaces, a pair of cross pins having axes lying in a common plane and located within the cylindrical surfaces of the ring, a transmission shaft having a hollow head and having flattened side portions that fit lateral bearing surfaces of the ring and inwardly extending side portions, one of the pins extending through openings formed in the said side portions of the head, the other of the pins extending through the inwardly extending side portions and the other pin.

In testimony whereof I have hereunto signed my name to this specification.

BERTIS H. URSCHEL.